United States Patent
Briggs, Jr. et al.

(10) Patent No.: US 6,238,232 B1
(45) Date of Patent: May 29, 2001

(54) HIGH DENSITY CONNECTOR MODULE (75) Inventors: Paul Raymond Briggs, Jr., Newton, NJ (US); Mark Steven Curtis, Papillion; John Francis May, Omaha, both of NE (US); Robert Kevin Noon, Tobyhanna, PA (US); Clarion Floyd Zoucha, Omaha, NE (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/387,456

(22) Filed: Sep. 1, 1999

(51) Int. Cl.[7] .............................. H01R 4/24; H01R 4/26; H01R 11/20
(52) U.S. Cl. ........................................... 439/404; 439/406
(58) Field of Search ...................... 439/404, 402, 439/406, 709, 718, 719

(56) References Cited

U.S. PATENT DOCUMENTS

| 3,798,587 | 3/1974 | Ellis, Jr. et al. . | |
|---|---|---|---|
| 4,171,857 | 10/1979 | Forberg et al. . | |
| 4,283,103 | 8/1981 | Forberg et al. . | |
| 4,372,634 | * 2/1983 | Ritchie et al. ..................... | 339/17 C |
| 4,460,229 | * 7/1984 | Matthews ............................ | 339/99 R |
| 5,575,689 | 11/1996 | Baggett et al. . | |

* cited by examiner

*Primary Examiner*—Lincoln Donovan
*Assistant Examiner*—Kyung Lee
(74) *Attorney, Agent, or Firm*—Duane, Morris & Heckscher LLP (57) ABSTRACT

The invention allows for an increase in termination density for customer cable pairs in electronic cabinets, building terminals, and protectors and switching equipment terminations in central offices by providing a connector module is provided having a first insulating housing cap including a row of slots and a row of contact cavities defined within the first housing cap by contact guiding walls. Each slot is adapted for receiving a wire and each cavity is arranged in open communication with one of the slots and has a first orientation relative to the slots. A second insulating housing cap including a row of slots and a row of contact cavities defined within the second housing cap by contact guiding walls. Each slot is adapted for receiving a wire and each cavity being arranged in open communication with one of the slots and has a second orientation relative to the slots. A row of contacts are mounted within the first and second housing caps. Each contact includes a first wire termination portion capable of providing electrical connection to a first wire and being mounted within the first housing cap so as to be positioned within the first housing cap slot, and a second wire termination portion capable of providing electrical connection to a second wire and being mounted within the second housing cap so as to be positioned within the second housing cap slot.

20 Claims, 7 Drawing Sheets

HIGH DENSITY CONNECTOR MODULE

FIELD OF THE INVENTION

The present invention generally relates to modules for electrically interconnecting sets of wires, and more particularly to a high density insulation displacement connector module.

BACKGROUND OF THE INVENTION

Connecting blocks are often used in telephone central offices, building entrance terminals, and outside plant cabinets for electrical connection between cables and cross-connect wiring. Prior art connecting blocks include rows of insulation displacement contacts mounted within a plastic housing. The housing provides access to the insulation displacement contacts which may include one or two insulation piercing slots. In practice, one set of wires is placed within a separate wire indexing strip to align the cable leads on one side of the connector. The contact module is then placed over the strip to terminate the wires.

For example, U.S. Pat. No. 3,798,587, issued to Ellis, Jr., et al.; U.S. Pat. Nos. 4,171,857 and 4,283,103, both issued to Forberg, et al.; and U.S. Pat. No. 5,575,689 issued to Baggeft, et al., all disclose IDC connector blocks that may be used in connection with the interconnection of cables and cross-connect wiring. In particular, Baggett, et al., disclose a ZIDC connector module having insulation displacement terminals and internal dual normally closed contacts, adapted for access by test cords and/or protector units, on both sides of the module, and on both sides of the cross-connect facility. Often, telephone central offices, building entrances terminals, and outside plant cabinets only require dual normally closed contacts for access by test cords on one side of the connector module. It has been discovered that by eliminating this feature on one side of the connection module, the size and cost can be reduced and/or the termination density can be increased.

There is a need for a high density ZIDC connector module that provides insulation displacing contact terminations, but without a normally closed contact thereby reducing the size of the connector, while also not requiring separate wire strips to align cable leads on one side of the connector. Additionally, this need must be satisfied without a need to retrofit current wire insertion tooling already in the field.

SUMMARY OF THE INVENTION

The present design allows for an increase in termination density for customer cable pairs in electronic cabinets, building terminals, and protectors and switching equipment terminations in central offices. In a preferred embodiment, a connector module is provided having a first insulating housing cap including a row of slots and a row of contact cavities defined within the first housing cap by contact guiding walls. Each slot is adapted for receiving a wire and each cavity is arranged in open communication with one of the slots and has a first orientation relative to the slots. A second insulating housing cap including a row of slots and a row of contact cavities defined within the second housing cap by contact guiding walls. Each slot is adapted for receiving a wire and each cavity being arranged in open communication with one of the slots and has a second orientation relative to the slots. A row of contacts are mounted within the first and second housing caps. Each contact includes a first wire termination portion capable of providing electrical connection to a first wire and being mounted within the first housing cap so as to be positioned within the first housing cap slot, and a second wire termination portion capable of providing electrical connection to a second wire and being mounted within the second housing cap so as to be positioned within the second housing cap slot.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
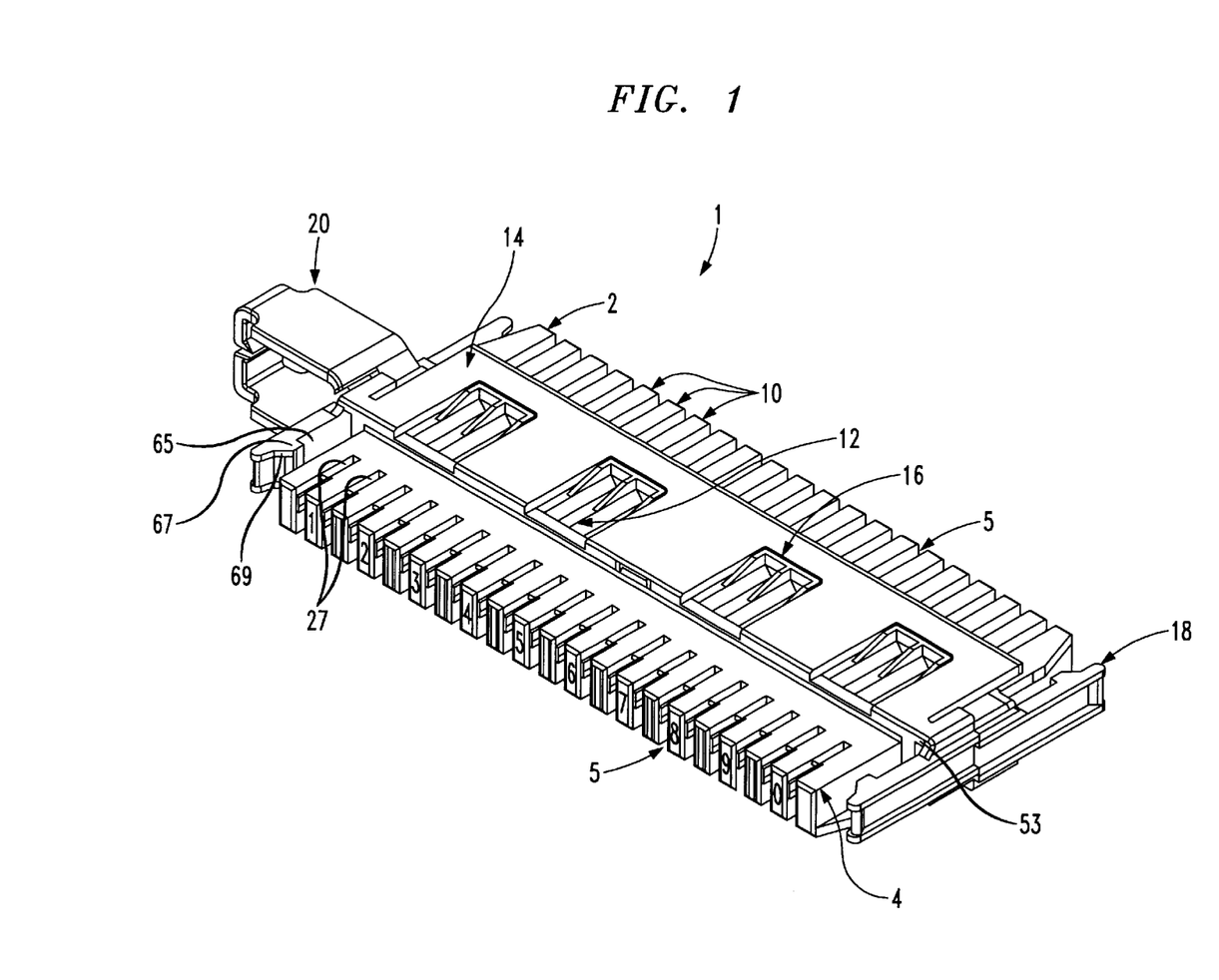
FIG. 1 is a perspective view of a high density ZIDC connector module formed in accordance with the present invention.
Figure 6:
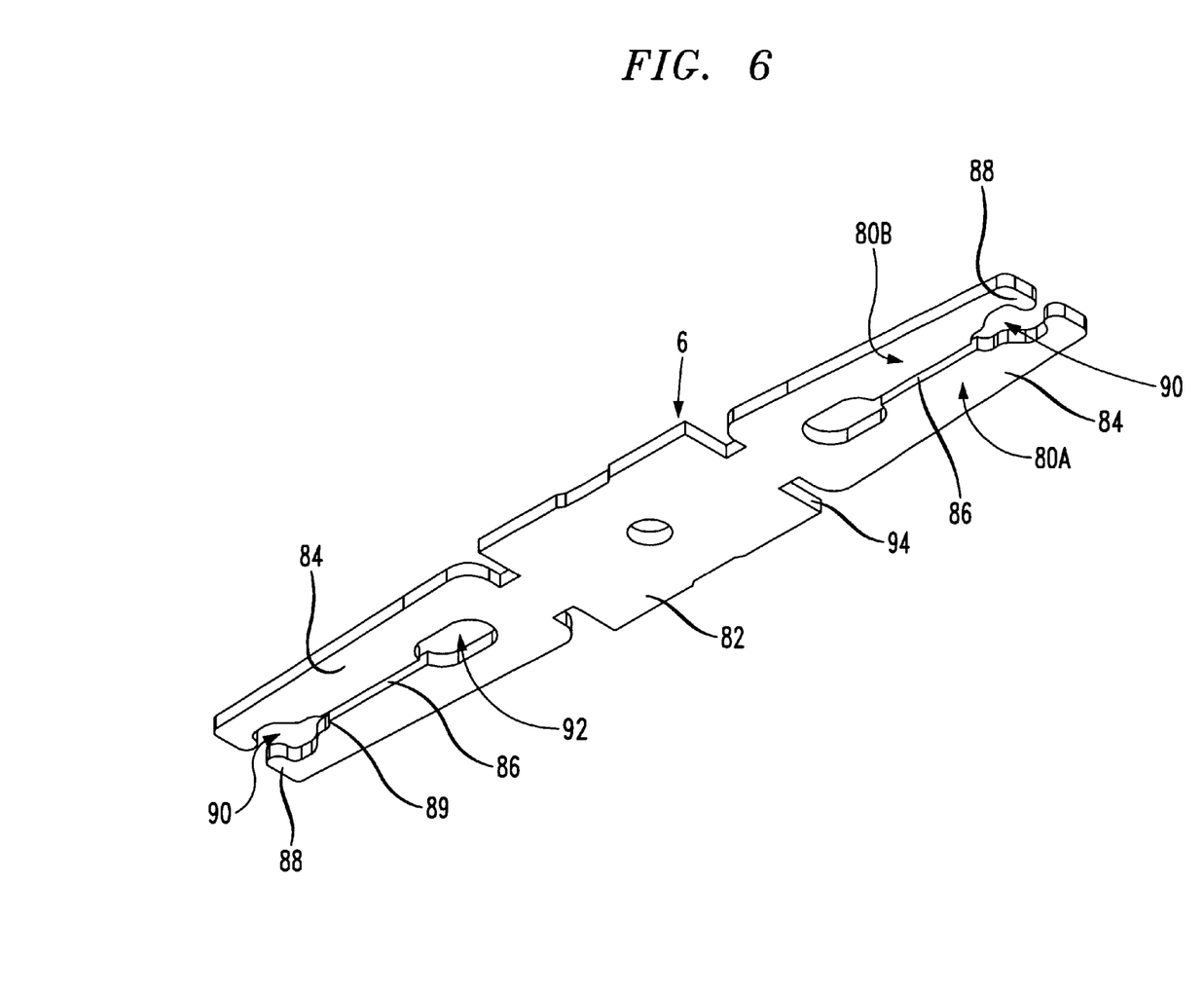
FIG. 6 is a perspective view of an insulation displacement contact terminal used in connection with the present invention.

Referring to FIG. 1, a ZIDC connector module 1 formed in accordance with the present invention includes a cross-connect cap 2, a cabling cap 4, and a plurality of insulation displacement contact terminals 6 (shown in FIG. 6, and referred to throughout this disclosure as IDC terminals 6). More particularly, and referring to FIGS. 1–3, cross-connect cap 2 is a generally rectilinear terminal housing that defines within its interior a plurality of individually delimited void spaces, which are often referred to in the art as contact or terminal "cavities", and generally designated in the various figures by reference numeral 5. Cross-connect cap 2 is often formed from a moldable insulating material, e.g., a thermoplastic of the type suitable for conventional injection molding processes. The walls of cross-connect cap 2 define features that are adapted for orienting, guiding, and retaining IDC terminal 6 and cabling cap 4, including a plurality of terminal towers 10, a corrugated wall 12, a flexible wall 14, an assembly latch 16, a mounting latch 18, and a cross-connect wire retainer clip 20.

Figure 3:
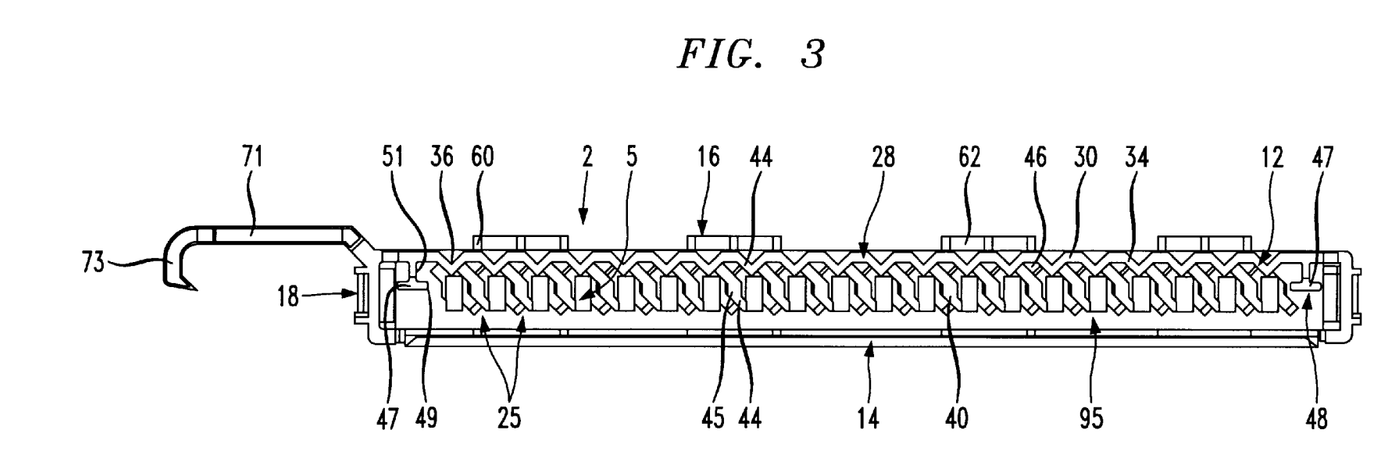
FIG. 3 is a plan view of the cross-connect cap shown in FIG. 2.

Referring to FIG. 3, plurality of terminal towers 10 are formed by a plurality of equally spaced-apart receptacles 25. Each terminal tower 10 is generally rectangularly shaped, with a generally rectangular slot defined by adjacent towers. Positioned along the base portion of each slot are a pair of inwardly projecting, opposed wiregripping ribs 27. Each wiregripping rib 27 has a substantially triangular cross-section, and extends about half way up the side of each tower's slot. Each pair of wire-gripping ribs 27 is oriented such that their respective apexes are not in confronting relation to one another, so that the portions of each wire that are engaged by a pair of wire-gripping ribs 27 are non-diametrically opposed to one another.

Figure 2:
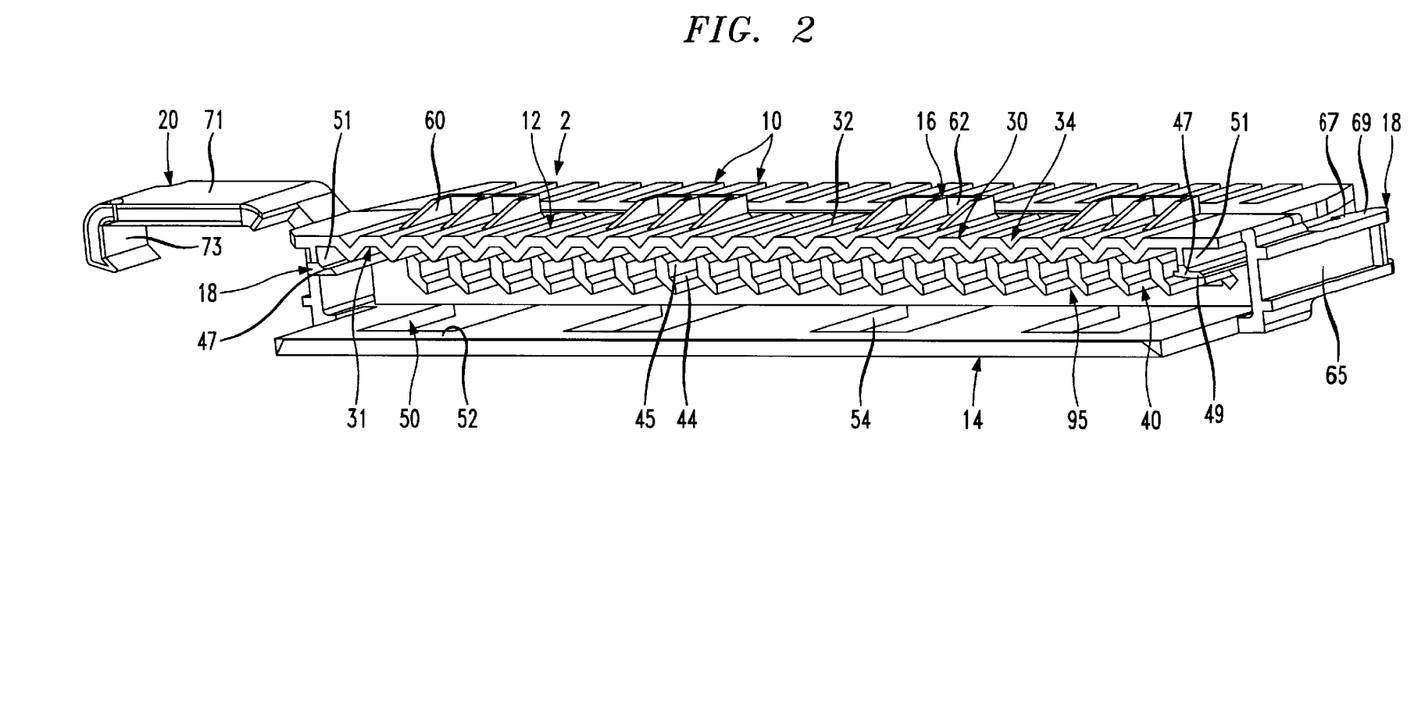
FIG. 2 is a perspective view of a cross-connect cap formed in accordance with the present invention.

Referring to FIG. 2, corrugated wall 12 defines the profile of a lower portion of each IDC terminal cavity 5, and extends the length of cross-connect cap 2. Corrugated wall 12 includes a plurality of frusto-triangular corrugations 28, each including a central wall 30, and a pair of side walls 34. Each central wall 30 is a substantially flat, rectangular partition having an inner surface 31 and an outer surface 32. Side walls 34 project outwardly from each side edge of central wall 30 in mutually diverging relation to one another. The end edges of side walls 34 of adjacent frusto-triangular corrugations 28 intersect to form an inwardly pointing mutual edge 36. A plurality of a generally "Z-shaped" insulating pedestals 40 each project inwardly in substantially parallel relation to one another from an inner surface of one of each of the pair of side walls 34. It will be understood that "Z-shaped" means that each insulating pedestal 40 includes 2 substantially parallel walls 44 that are joined together by a third wall 45 that is oriented at an angle relative to substantially parallel walls 44. Substantially parallel walls 44 are arranged so that they are oriented in substantially parallel relation to the inner surface of each side wall 34 of each adjacent corrugation 28. Insulating pedestals 40 are positioned within, and extend the length of each receptacle 25, and further define IDC terminal cavity 5. A triangular shoulder 46 is located within IDC terminal cavity 5, adjacent inner surface 31. A positioning tee 48 projects inwardly from each inner end portion of corrugated wall 12, adjacent to the end ones of pedestals 40. Tee 48 includes a tee flange 49 that is disposed in substantially perpendicular relation to a web beam 51 and substantially parallel relation to corrugated wall 12. A chamfered surface 47 faces outwardly from the top of tee 48.

Flexible wall 14 is cantilevered to a lower longitudinal edge 53 of terminal tower 10, in substantially parallel spaced relation to corrugated wall 12. Preferably, flexible wall 14 is substantially flat. A plurality of latch windows 50 are defined along the length of flexible wall 14, each window being defined by a transverse edge 52 and a pair of opposed side edges 54. Flexible wall 14 is sufficiently resilient to accept substantial outward bending, i.e., bending away from corrugated wall 12, when cross-connect cap 2 is fully assembled to cabling cap 4, as will hereinafter be disclosed in further detail.

At least one assembly latch 16 is positioned on the outer surface of corrugated wall 12. Preferably, three or four assembly latches 16 are on corrugated wall 12 in spaced relation to one another. Each assembly latch 16 includes three ramps 60 that extend away from a stud 62 that is disposed in substantially perpendicular relation to an end of each ramp. Each stud 62 is sized so that it may fit between opposed side edges 54 of flexible wall 14, when cross-connect cap 2 and cabling cap 4 are mated together. Ramps 60 are inclined so as to act as a camming surface when acting against flexible wall 14 during assembly.

A mounting latch 18 is positioned on each side surface of cross-connect cap 2, and includes a cantilevered, channel shaped beam 65 and a latch step 67 positioned at the free end of beam 65. Beam 65 is fixed to an end edge of cross-connect cap 2, in spaced relation to positioning tee 48 (FIG. 3). Latch step 67 is positioned in confronting spaced relation with the end ones of terminal towers 10. Latch step 67 further includes an incline edge 69 that extends from latch step 67 to the free end of beam 65. Inclined edge 69 is adapted for engaging the edge of a corresponding receptacle opening (not shown) such that beam 65 is deflected outwardly, away from terminal towers 10, by a distance sufficient to allow mounting latch 18 to enter the receptacle opening so that latch step 67 may engage the receptacle edge. A cross-connect wire retainer clip 20 projects outwardly from one end of cross-connect cap 2, and includes a cover projection 71 and a snap-in gate 73.

Figure 4:
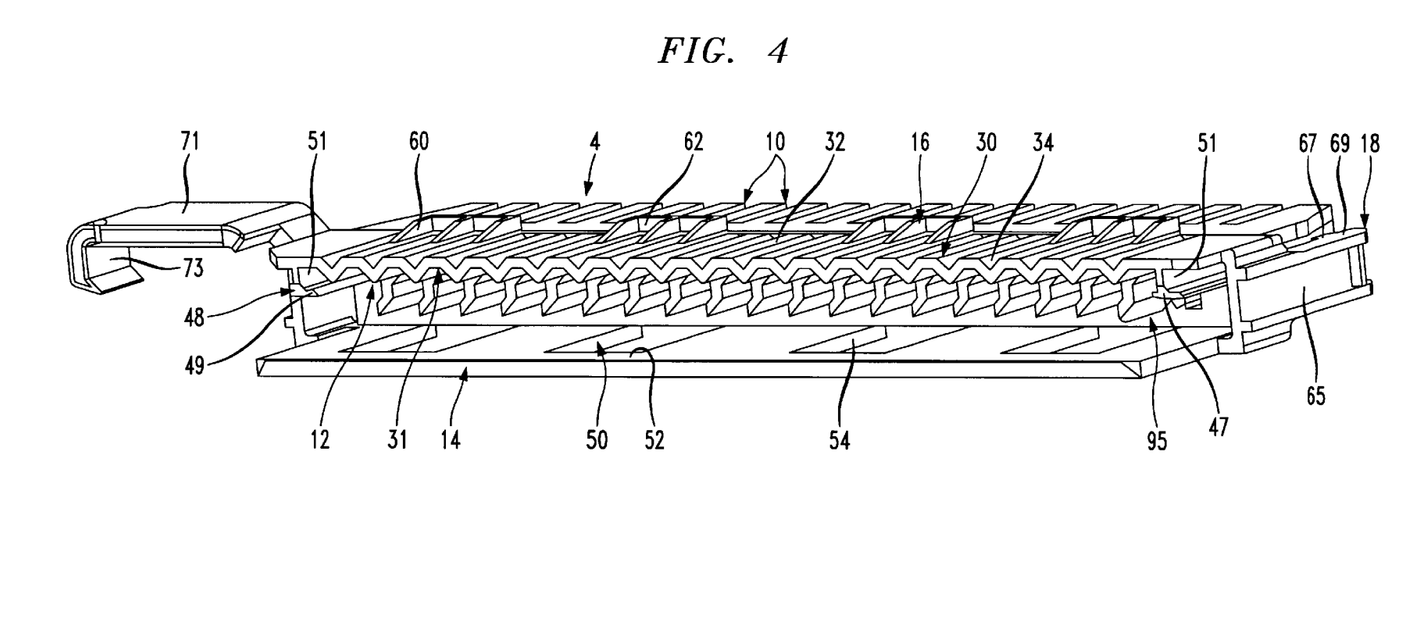
FIG. 4 is a perspective view of a cabling cap formulated in accordance with the present invention.
Figure 5:
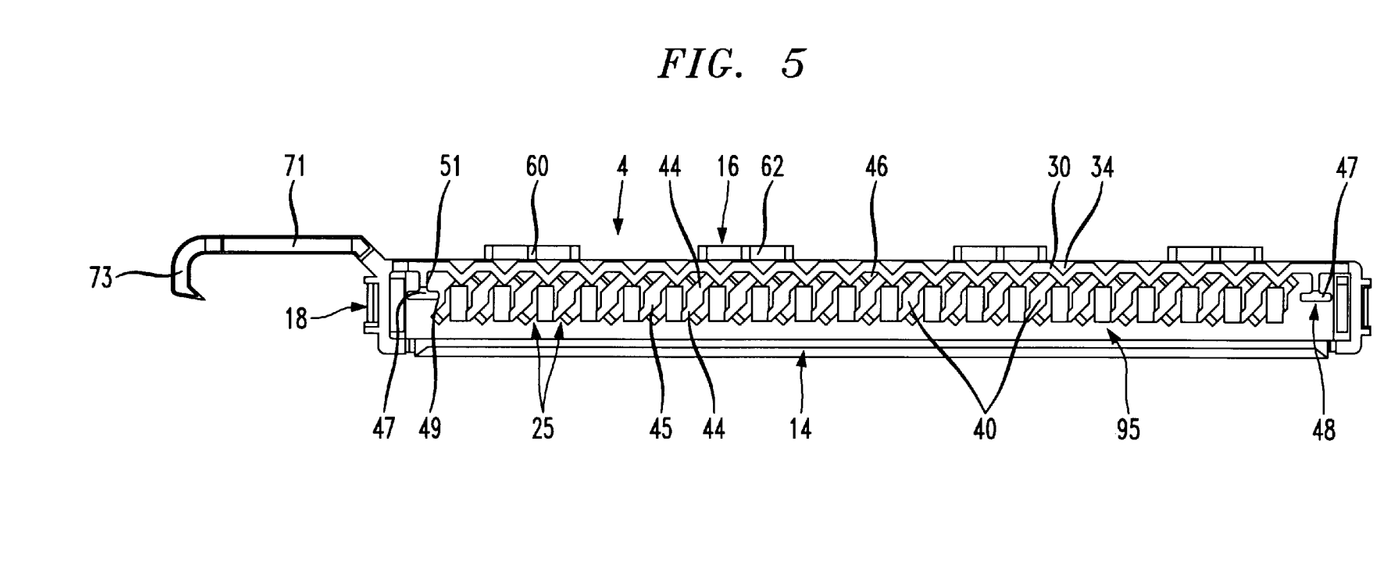
FIG. 5 is an elevational view of the cabling cap shown in FIG. 4.

Referring to FIGS. 2–4, it will be understood that cross-connect cap 2 and cabling cap 4 are substantially similar to one another, with those features which are identical having like reference numerals in the various figures. Significantly, the corrugated wall of cross-connect cap 2 and cabling cap 4 are shifted slightly (in opposite directions) with respect to their assembly latch studs 62 and IDC terminal cavities 5. Further, IDC terminal cavities 5 and insulating pedestals 40 of cross-connect cap 2 and cabling cap 4 are arranged so as to have opposite 45 degree diagonal orientations, as seen most clearly when comparing pedestals 40 in FIGS. 3 and 5. Thus, cross-connect cap insulating pedestals 40 are rotated 45 degrees counter-clockwise as shown in FIG. 3, and cabling cap 4 insulating pedestals 40 are rotated 45 degrees clockwise as shown in FIG. 5. Cross-connect cap 2 and cabling cap 4 provide a "quiet front" insulated assembly that helps avoid accidental contact between ZIDC terminals 6 and items, such as a telephone technicians electrically conductive tools, which could result in service problems.

Referring to FIG. 6, IDC terminal 6 is formed as a flat stamping, via a high speed stamping die of a type well known in the art. IDC terminal 6 is formed from a copper alloy, such as phosphor bronze, beryllium copper, or the like and is often plated with a highly conductive metal, such as gold, tin, or their alloys. A pair of slotted beams 80A and 80B project outwardly from opposite ends of a central carrier strip 82. Slotted beams 80A, 80B, and carrier strip 82 are coplanar so as to facilitate high speed stamping.

Each slotted beam 80A, 80B, includes a pair of opposed arms 84 that are spaced apart by a wire receiving slot 86. A pair of inwardly protruding beaks 88 are disposed at the free end of each arm 84. Below beaks 88 is a wire retention receptacle 90 that is adapted to retain insulated wires just below beaks 88 and above termination slot 86 until the wire is fully inserted into slot 86 using a known wire insertion tool (not shown). The arms 84 deflect outwardly, away from one another when an insulated wire is forced into slot 86 from retention receptacle 90. As this occurs, the upper edges 89 of arms 84 that are adjacent to the opening of slot 86 gouge the insulation of the insulated wire and strip it away so as to expose the underlying conductors. The resiliency of beams 80A, 80B is adjusted by adjusting the diameter of opening 92 located at the base end of slot 86. Carrier strip 82 comprises a substantially rectangular portion of the original copper alloy strip and includes a pair of shoulder surfaces 94 disposed adjacent to the bottom end of each slotted beam 80A, 80B.

ZIDC connector module 1 may be formed to service a ten wire pair configuration, although other sizes may be provided. In one embodiment of the invention, an eight pair version having the same physical size as the ten pair version is provided. Prior to assembly of cross-connect cap 2 with cabling cap 4, as shown, in FIG. 7, each cap has assembled within its receptacles 25 a plurality of IDC terminals 6. IDC terminals 6 are loaded into receptacles 25 in the following manner. IDC terminals 6 are first oriented such that beaks 88 are positioned in spaced confronting relation with IDC terminal cavities 5, such that they are positioned between a pair of adjacent insulating pedestals 40. Once in this position, each IDC terminal 6 is moved toward the cap so that beaks 88 pass between insulating pedestals 40, with IDC terminal 6 being disposed in substantially parallel relation to each adjacent insulating pedestals 40. Each IDC terminal 6 is moved toward its respective terminal towers 10 until shoulders 94 of carrier strip 82 engage triangular shoulder 46 on one side of IDC terminal cavity 5 and a floor portion of the cap indicated generally at 95 in the Figures. It should be noted that IDC terminals 6 are guided into terminal cavities 5 (located within terminal towers 10) not only by the cavity itself, but also by the diagonal surfaces of insulating pedestals 40 and the diagonal surfaces of corrugated wall 12. Shoulders 92 of IDC terminals 6 are supported by triangular shoulder 46 and floor 95 of each cap, at opposing ends of terminal cavities 5.

Figure 7:
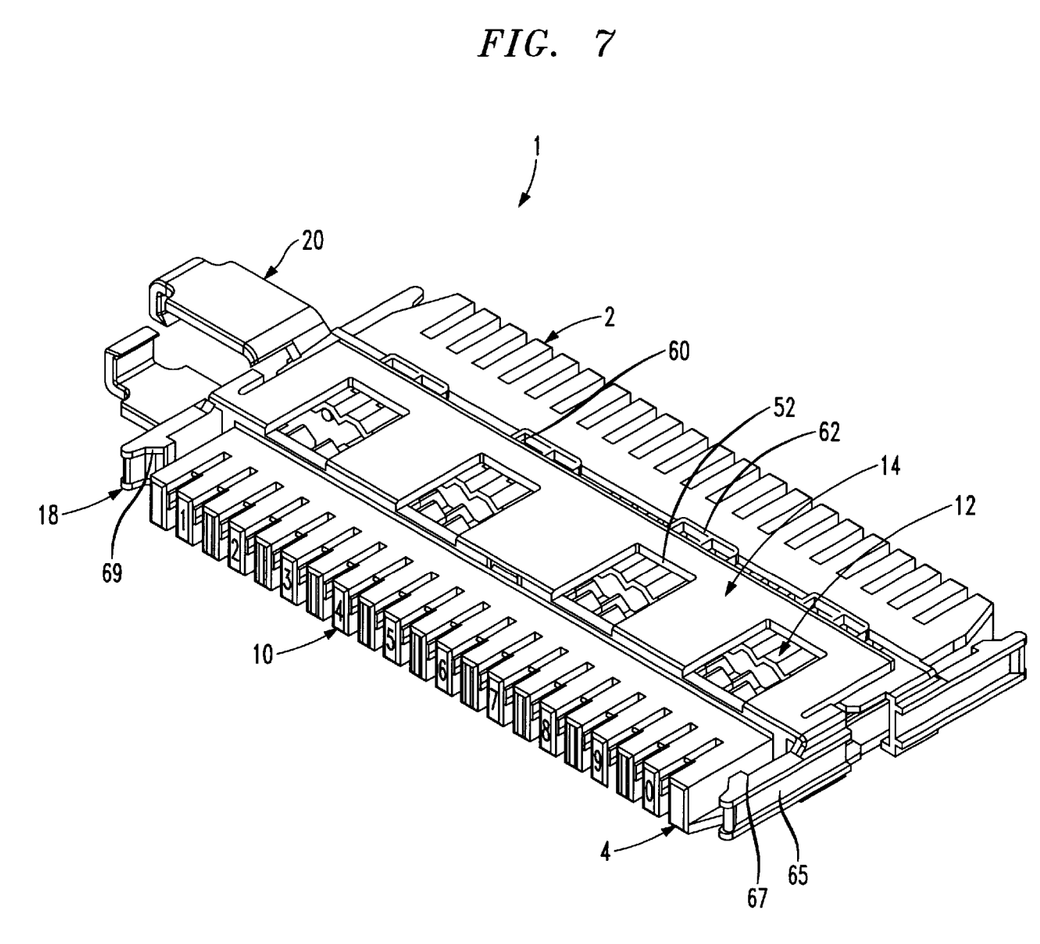
FIG. 7 is a perspective view of a cross-connect cap and a cabling cap as shown in FIGS. 2–5, engaged with one another, but just prior to complete assembly of the high density ZIDC module of the invention.

Once IDC terminals 6 are fully loaded within either cross-connect cap 2 or cabling cap 4, the caps can be mated. More particularly, the cap that has been loaded with IDC terminal 6 is aligned with an unloaded cap such that cross-connect wire retainer clips 20, disposed at the ends of each cap, are positioned in opposed relation to one another. In this configuration, flexible wall 14 of each cross-connect cap 2 is positioned in substantially confronting relation with ramps 60 of assembly latches 16. Once in this configuration, the caps are moved together so that chamfered surfaces 47 tees 48 on each cap engage one another, and thereby force the faces of each tee flange 49 into alignment. At the same time, each flexible wall 14 is biased outwardly away from corrugated wall 12 by ramps 60 of assembly latches 16. It should be noted that chamfers 47 at the outside end corners of corrugated walls 12 help align each cross-connect cap 2 and cabling 4 to one another from end to end, and the free end of each insulating pedestal 40 of one cap nests into the corrugations 28 of the mating cap. (FIG. 7). It will also be noted that IDC terminals 6 help to align caps 2,4 during mating.

Once caps 2,4 are fully mated, i.e., the slotted beam portions of IDC terminals 6 are fully positioned within receptacles 25 of the mating cap, with shoulders 92 in position in engaged relation with triangular shoulder 46 and floor 95, transverse edge 52 of each window 50 slips past stud 62 and, due to the resilient nature of flexible wall 14, snaps down so that studs 62 engage transverse edge 52 and assembly latches 16 protrude through windows 50.

Significantly, a uniform wall thickness for the molded caps must be maintained in order to optimize the molding process. It has been found that mounting latch 18 provides best results when it is formed with a "C-channel" cross-section that maintains stiffness while minimizing material usage. Assembly latch 16 comprises a series of ribs, or ramps 60 instead of a solid block, again to improve molding. The C-channel of mounting latch 18 forms edge ribs that run the entire outside length of each latch, and around the tip so as to form inclined edge 69. Significantly, the recessed portion between inclined edges 69 and latch step 67 provide a strength to prohibit a conventional hook tool that is used with a "system wire insertion tool" from slipping off mounting latch 18 while releasing the latch. It will be understood that the inside top area of mounting latch 18 and inclined edges 69 help guide ZIDC connector module 1 into a sheet metal mounting bracket of the type well known in the art.

It is to be understood that the present invention is by no means limited only to the particular constructions herein disclosed and shown in the drawings, but also comprises any modifications or equivalents within the scope of the claims.

What is claimed is:

1. A connector module comprising:
 a first insulating housing cap including a row of slots wherein each slot is sized to receive a wire and a row of contact cavities defined within said first housing cap by contact guiding walls each cavity being arranged in open communication with one of said slots and having a first angular orientation relative to said slots;
 a second insulating housing cap including a row of slots wherein each slot is sized to receive a wire and a row of contact cavities defined within said second housing cap by contact guiding walls each cavity being arranged in open communication with one of said slots and having a second angular orientation relative to said slots;
 wherein in each of said slots in said first and second housing caps are further defined by a pair of inwardly projecting, opposed wire-gripping ribs, with each wire-gripping rib having a triangular cross-section including an inwardly positioned apex and projecting into a portion of said slot;
 a row of contacts mounted within said first and second housing caps, each contact including;
  a first wire termination portion that provides electrical connection to a first wire and being mounted within said first housing cap so as to be positioned within said first housing cap slot having said first angular orientation; and
  a second wire termination portion that provides electrical connection to a second wire and being mounted within said second housing cap so as to be positioned within said second housing cap slot having said second angular orientation.

2. A connector module according to claim 1 wherein said first and second housing cap slots are defined by a plurality of spaced apart rectangularly shaped and arranged terminal towers so that said slots are defined by adjacent ones of said towers.

3. A connector module according to claim 1 wherein each pair of wire-gripping ribs is oriented such that their respective apexes are not in confronting relation to one another so that said pair of wire-gripping ribs are off-set with respect to one another.

4. A connector module according to claim 1 wherein said first housing cap and said second housing cap each include a corrugated wall and a flexible wall that project outwardly from an entrance to said row of contact cavities in spaced relation to one another.

5. A connector module according to claim 1 wherein each wire termination portion provides electrical connection by means of an insulation displacement slot.

6. A connector module according to claim 5 wherein said corrugated wall includes a plurality of frusto-triangular corrugations, each including a flat central wall having spaced-apart side edges and side walls that project outwardly from each said side edge in mutually diverging relation to one another.

7. A connector module according to claim 4 comprising two positioning tees that project inwardly from inner end portions of said corrugated wall each tee including a flange that is disposed in perpendicular relation to a web beam and parallel relation to said corrugated wall and a chamfered surface facing outwardly from a top portion of each tee.

8. A connector module according to claim 4 wherein said flexible wall is cantilevered to an edge portion of each of said housing caps in parallel spaced relation to said corrugated wall, said flexible wall including at least one latch window defined by a transverse edge and a pair of opposed side edges.

9. A connector module according to claim 4 comprising at least one assembly latch positioned on an outer surface of said corrugated wall of each of said first and second housing caps, each assembly latch including at least one ramp that extends away from a stud that is disposed in perpendicular relation to an end of said ramp, wherein said stud is sized so as to be received between said opposed side edges of said flexible wall when said first housing cap and said second housing cap are mated together.

10. A connector module according to claim 4 wherein said corrugated walls of said first housing cap and said second housing cap are shifted slightly in opposite directions relative to one another and with respect to said assembly latch studs and said cavities.

11. A connector module according to claim 4 comprising two mounting latches positioned on each side surface of said first and second housing caps wherein each of said mounting latches include a cantilevered channel shaped beam and a latch step positioned at a free end of said beam.

12. A connector module according to claim 6 comprising a plurality of insulating pedestals each projecting inwardly in parallel relation to one another from an inner surface of one of each of said side walls wherein each of said insulating pedestals includes two parallel walls that are joined together by an intermediate wall that is oriented at an angle relative to said parallel walls.

13. A connector module according to claim 12 wherein said parallel walls are arranged so that they are also oriented in parallel relation to an inner surface of a side wall of each adjacent corrugation.

14. A connector module according to claim 12 wherein said cavities and said insulating pedestals of said first housing cap and said second housing cap are arranged so as to have (i) mutually opposing diagonal orientations corresponding to said first and second orientations when said housing caps are in a disassembled position, and (ii) mutually aligned diagonal orientations when said housing caps are in an assembled position.

15. A connector module according to claim 14 wherein said insulating pedestals of said first housing cap are rotated 45 degrees counter-clockwise and said insulating pedestals of said second housing cap are rotated 45 degrees clockwise.

16. A connector module according to claim 12 wherein said insulating pedestals are positioned within, and extend the length of each of said cavities and include a triangular shoulder adjacent said inner surface of said side wall.

17. A connector module comprising:
a first insulating housing cap including a row of slots wherein each slot is sized to receive a wire and a row of contact cavities defined within said first housing cap by contact guiding walls each cavity being arranged in open communication with one of said slots and having a first angular orientation relative to said slots;
a second insulating housing cap including a row of slots wherein each slot is sized to receive a wire and a row of contact cavities defined within said second housing cap by contact guiding walls each cavity being arranged in open communication with one of said slots and having a second angular orientation relative to said slots wherein said cavities are arranged so as to have (i) mutually opposing diagonal orientations corresponding to said first and second orientations when said housing caps are in a disassembled position, and (ii) mutually aligned diagonal orientations when said housing caps are in an assembled position;
wherein in each of said slots in said first and second housing caps are further defined by a pair of inwardly projecting, opposed wire-gripping ribs, with each wire-gripping rib having a triangular cross-section including an inwardly positioned apex and projecting into a portion of said slot;
a row of contacts mounted within said first and second housing caps, each contact including;
a first wire termination portion that provides electrical connection to a first wire and being mounted within said first housing cap so as to be positioned within said first housing cap slot; and
a second wire termination portion that provides electrical connection to a second wire and being mounted within said second housing cap so as to be positioned within said second housing cap slot.

18. A connector module according to claim 17 wherein said cavities of said first housing cap are rotated 45 degrees counter-clockwise and said cavities of said second housing cap are rotated 45 degrees clockwise.

19. A connector module according to claim 17 wherein said first housing cap and said second housing cap each include a corrugated wall and a flexible wall that project outwardly from an entrance to said row of contact cavities in spaced relation to one another, wherein said corrugated wall includes a plurality of frusto-triangular corrugations, each including a flat central wall having spaced apart side edges and side walls that project outwardly from each said side edge in mutually diverging relation to one another and further comprising a plurality of insulating pedestals each projecting inwardly in parallel relation to one another from an inner surface of one of each of said side walls wherein each of said insulating pedestals includes two parallel walls that are joined together by an intermediate wall that is oriented at an angle relative to said parallel walls.

20. A connector module comprising:
a first insulating housing cap including a row of slots wherein each slot is sized to receive a wire and a row of contact cavities defined within said first housing cap by contact guiding walls each cavity being arranged in open communication with one of said slots and having a first angular orientation relative to said slots;
a second insulating housing cap including a row of slots wherein each slot is sized to receive a wire and a row of contact cavities defined within said second housing cap by contact guiding walls each cavity being arranged in open communication with one of said slots and having a second angular orientation relative to said slots;
said first housing cap and said second housing cap each include a corrugated wall and a flexible wall that project outwardly from an entrance to said row of contact cavities in spaced relation to one another wherein said corrugated wall includes a plurality of frusto-triangular corrugations, each including a flat central wall having spaced-apart side edges and side walls that project outwardly from each said side edge in mutually diverging relation to one another;
a row of contacts mounted within said first and second housing caps, each contact including;
a first wire termination portion that provides electrical connection to a first wire and being mounted within said first housing cap so as to be positioned within said first housing cap slot having said first angular orientation; and
a second wire termination portion that provides electrical connection to a second wire and being mounted within said second housing cap so as to be positioned within said second housing cap slot having said second angular orientation.

* * * * *